United States Patent
Baldemair et al.

(10) Patent No.: US 10,631,280 B2
(45) Date of Patent: Apr. 21, 2020

(54) VARIABLE SUBBAND CONFIGURATION OF SEARCH SPACE

(71) Applicant: TELEFONAKTIEBOLAGET LM ERICSSON (PUBL), Stockholm (SE)

(72) Inventors: Robert Baldemair, Solna (SE); Sorour Falahati, Stockholm (SE); Daniel Larsson, Stockholm (SE); Stefan Parkvall, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 86 days.

(21) Appl. No.: 15/519,930

(22) PCT Filed: Dec. 21, 2016

(86) PCT No.: PCT/SE2016/051302
§ 371 (c)(1),
(2) Date: Apr. 18, 2017

(87) PCT Pub. No.: WO2018/084758
PCT Pub. Date: May 11, 2018

(65) Prior Publication Data
US 2018/0124748 A1 May 3, 2018

Related U.S. Application Data

(60) Provisional application No. 62/417,285, filed on Nov. 3, 2016.

(51) Int. Cl.
*H04W 72/04* (2009.01)
*H04W 74/08* (2009.01)
(Continued)

(52) U.S. Cl.
CPC ......... *H04W 72/042* (2013.01); *H04L 5/0053* (2013.01); *H04L 5/0092* (2013.01);
(Continued)

(58) Field of Classification Search
None
See application file for complete search history.

(56) References Cited

U.S. PATENT DOCUMENTS

2012/0250551 A1* 10/2012 Sartori ............... H04W 48/12
370/252
2012/0263047 A1 10/2012 Love et al.
(Continued)

FOREIGN PATENT DOCUMENTS

WO 2016071765 A1 5/2016

OTHER PUBLICATIONS

3GPP, "3rd Generation Partnership Project; Technical Specification Group Radio Access Network; Study on New Radio (NR) Access Technology Physical Layer Aspects (Release 14)," 3GPP TR 38.802 V0.3.0, Oct. 2016.
(Continued)

*Primary Examiner* — Charles C Jiang
*Assistant Examiner* — Saad Khawar
(74) *Attorney, Agent, or Firm* — Withrow & Terranova, PLLC

(57) ABSTRACT

Radio communication systems, devices and methods for enabling variable subband configuration of one or more search spaces. In a first time interval, a UE attempts to decode one or more control channels on downlink or sidelink resources of a first subband configuration. In a second time interval, the UE attempts to decode one or more control channels on downlink or sidelink resources of a second subband configuration. The first subband configuration spans a first frequency range and the second subband configuration spans a second frequency range different from the first frequency range.

41 Claims, 5 Drawing Sheets

(51) Int. Cl.
    *H04W 28/20*    (2009.01)
    *H04L 5/00*     (2006.01)
    *H04W 88/02*    (2009.01)
(52) U.S. Cl.
    CPC ......... *H04W 28/20* (2013.01); *H04W 72/044*
        (2013.01); *H04W 74/0833* (2013.01); *H04W
                                    88/02* (2013.01)

(56)                References Cited

U.S. PATENT DOCUMENTS

| | | | |
|---|---|---|---|
| 2015/0282068 A1* | 10/2015 | Rajagopal | H04W 52/0206 370/350 |
| 2016/0135176 A1* | 5/2016 | Wong | H04W 4/70 370/329 |
| 2016/0302092 A1* | 10/2016 | Sartori | H04W 52/0209 |
| 2017/0208591 A1* | 7/2017 | Rico Alvarino | H04W 4/70 |
| 2017/0339677 A1* | 11/2017 | Rico Alvarino | H04L 5/0091 |
| 2018/0020408 A1* | 1/2018 | Zhang | H04W 76/28 |

OTHER PUBLICATIONS

International Search Report in corresponding International Application No. PCT/SE2016/051302 dated Jul. 14, 2017.
Written Opinion in corresponding International Application No. PCT/SE2016/051302 dated Jul. 14, 2017.
Motorola Mobility; "Shortened TTI design"; 3GPP TSG RAN WG1#86bis; R1-1609914; Oct. 10-14; pp. 1-5; Lisbon, Portugal.
International Preliminary Report on Patentability in International Application No. PCT/SE2016/051302 dated Jan. 25, 2019. (All references not cited herewith have been previously made of record).

* cited by examiner

VARIABLE SUBBAND CONFIGURATION OF SEARCH SPACE

TECHNICAL FIELD

Embodiments of the present invention generally relate to radio communications, and more particularly, to radio communication systems, devices and methods for enabling variable subband configuration of one or more search spaces.

BACKGROUND

In a cellular communications network, a user equipment (UE) may communicate with a base station (BS) using a number channels including uplink (towards the BS from the UE) and downlink (towards the UE from the BS) channels. Downlink control channels may transmit, e.g., scheduling information to a UE from the BS.

Conventionally, a user equipment (UE) may attempt to decode candidate control channels in a designated search space. For example, in Long-Term Evolution (LTE), a search space is a set of candidate control channels which a UE is supposed to attempt to decode. There may be more than one search space. In particular, a search space may be a common search space, which is common to all UEs of the cell, or a UE search space, which is typically determined by a non-infective function of UE identity and may thus be shared with some other (though not all) UEs of the cell. In a LTE cell, all search spaces are contained in a constant set of one or more subbands. As a consequence, a LTE base station transmits control channels to all UEs in the same set of subbands. This restricts the scheduler's ability to offload a subband in the set during traffic peaks. It also restricts the scheduler's ability to avoid or reduce interference.

SUMMARY

According to an embodiment, a method implemented in a user equipment (UE) is provided. In a first time interval, a UE attempts to decode one or more control channels on downlink or sidelink resources of a first subband configuration. In a second time interval, the UE attempts to decode one or more control channels on downlink or sidelink resources of a second subband configuration. The first subband configuration spans a first frequency range and the second subband configuration spans a second frequency range different from the first frequency range.

According to another embodiment, a UE comprising a communication interface and processing circuitry is provided. The processing circuitry is configured to cause the UE to, in a first time interval, to attempt to decode one or more control channels received using the communication interface on downlink or sidelink resources of a first subband configuration. The processing circuitry is configured to cause the UE to, in a second time interval, attempt to decode one or more control channels received using the communication interface on downlink or sidelink resources of a second subband configuration. The first subband configuration spans a first frequency range and the second subband configuration spans a second frequency range different from the first frequency range.

According to another embodiment, a method implemented in a network node is provided. In a first time interval, the network node transmits a control channel on downlink or sidelink resources of a first subband configuration to a UE. In a second time interval, the network node transmits a control channel on downlink or sidelink resources of a second subband configuration to the UE. The first subband configuration spans a first frequency range and the second subband configuration spans a second frequency range different from the first frequency range.

According to another embodiment, a network node comprising a communication interface and processing circuitry is provided. The processing circuitry causes the network node, in a first time interval, to transmit a control channel on downlink or sidelink resources of a first subband configuration to a UE. The processing circuitry causes the network node, in a second time interval, to transmit a control channel on downlink or sidelink resources of a second subband configuration to the UE. The first subband configuration spans a first frequency range and the second subband configuration spans a second frequency range different from the first frequency range.

DETAILED DESCRIPTION

Figure 1:
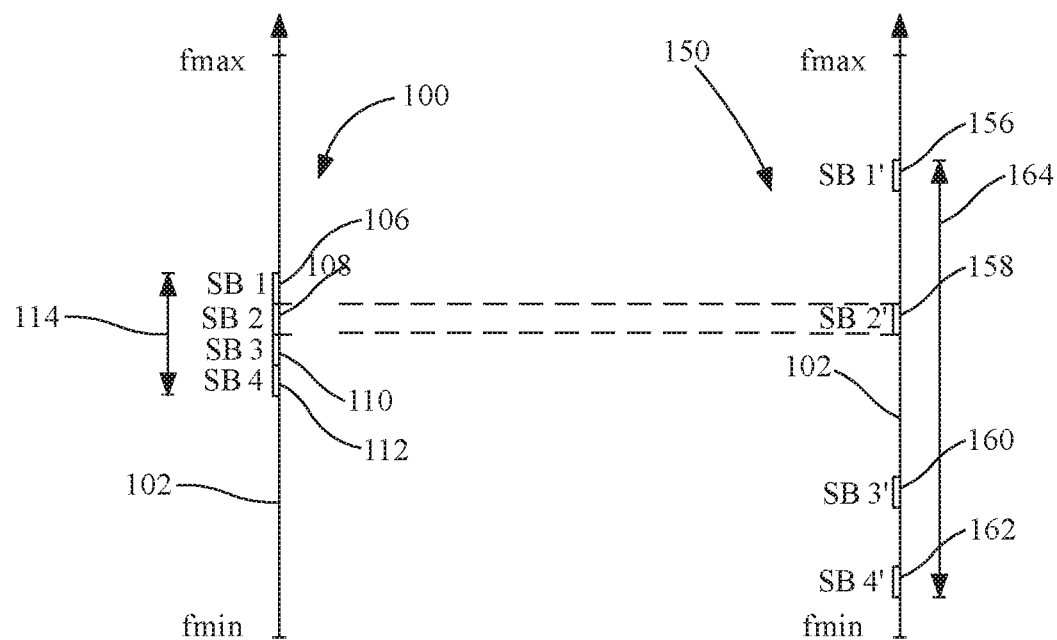
FIG. 1 is a schematic representation of exemplary first and second subband configurations corresponding to first and second search spaces, in accordance with an exemplary embodiment.

The following description of the exemplary embodiments refers to the accompanying drawings. The same reference numbers in different drawings identify the same or similar elements. The following detailed description does not limit the invention. Instead, the scope of the invention is defined by the appended claims. The embodiments to be discussed next are not limited to the configurations described below, but may be extended to other arrangements as discussed later.

Reference throughout the specification to "one embodiment" or "an embodiment" (or the like) means that a particular feature, structure or characteristic described in connection with an embodiment is included in at least one embodiment of the subject matter disclosed. Thus, the appearance of the phrases "in one embodiment" or "in an embodiment" (and the like) in various places throughout the specification is not necessarily referring to the same embodiment. Further, the particular features, structures or characteristics may be combined in any suitable manner in one or more embodiments. Reference to "first" and "second" (and the like) elements are used herein to distinguish one like element from another, in some cases, at a particular instance in time. These terms may be interchangeable and should not be used to limit said elements. Similarly, references to "narrow" or "collapsed" and "wide" or "expanded" elements are used herein to distinguish one like element from another, in some cases, at a particular instance in time. These terms may be interchangeable and should not be used to limit said elements.

Embodiments described herein may provide for, among other things, a network which may configure which frequency subbands one or more search spaces are located within. As such the following description starts with a more detailed discussion of the terminology generally, followed by a description of various embodiments.

The term "user equipment" (UE) refers to any type of wireless device communicating with a network node and/or with another UE in a cellular or mobile communication system. Non-limiting examples of UEs include target devices, device to device (D2D) UEs, machine type UEs or UEs capable of machine to machine (M2M) communication, PDAs, tablet computers, mobile terminals, smart phones, laptop embedded equipment (LEE), laptop mounted equipment (LME), USB dongles, ProSe UEs, V2V UEs, V2X UEs, MTC UEs, eMTC UEs, FeMTC UEs, UE Cat 0, UE Cat M1, narrow band Iot (NB-IoT) UEs, UE Cat NB1, etc.

The term "network node" is used in a broader sense as corresponding to any type of radio network node or any network node, which communicates with a UE and/or with another network node. Non-limiting examples of network nodes are NodeBs, MeNBs, SeNBs, network nodes belonging to MCG or SCG, base stations (BSs), multi-standard radio (MSR) radio nodes such as MSR BSs, eNodeBs, network controllers, radio network controllers (RNC), base station controllers (BSC), relays, donor node controlling relays, base transceiver stations (BTS), access points (AP), transmission points, transmission nodes, RRU, RRH, nodes in distributed antenna system (DAS), core network nodes (e.g. MSC, MME, etc), O&M, OSS, SON, positioning nodes (e.g. E-SMLC), MDT, test equipment, etc.

The term "5G" refers to Fifth generation of mobile telecommunications and wireless technology, which is not yet fully defined but in an advanced draft stage within 3GPP, including work on 5G New Radio (NR) Access Technology. LTE terminology is used in this disclosure in a forward looking sense, to include equivalent 5G entities or functionalities although a different term is specified in 5G.

The term "search space" refers to a set of candidate control channels formed by control channel elements (CCEs) at a given CCE aggregation level, which the terminal is supposed to attempt to decode.

The term "transmission time interval" (TTI) refers to a duration of a transmission on a radio link and may be configurable.

The term "subframe" refers to a measure that may correspond to a TTI. For example, in LTE, one subframe may correspond to 1 TTI.

The term "slot" refers to a measure that may correspond to a subframe. For example, a 5G subframe may alternatively be referred to as a slot.

The term "subband" refers to a frequency subband that may belong to a preconfigured frequency segmentation.

The term "frequency range" refers to an interval of absolute frequency and may be expressed as a combination of a bandwidth and a frequency. For example, a subband corresponds to the frequency range [1000, 1020] (MHz), which can be expressed equivalently as 20 MHz centered at 1010 MHz.

The term "bandwidth" refers to a length of one or more frequency ranges. For example, the bandwidth of [1000, 1020] is 20 MHz. [1000, 1020] occupies a bandwidth of 20 MHz. The bandwidth of [1000, 1020]∪[1050, 1055] is 25 MHz.

The expression "span a bandwidth" refers to the length between outer endpoints of a single frequency range or the outer endpoints of a union of frequency ranges. For example, [1000, 1020] spans a bandwidth of 20 MHz. The union [1000, 1020]∪[1050, 1055] spans a bandwidth of 55 MHz. The union [1000, 1020]∪[1015, 1025]∪[1050, 1055] spans a bandwidth of 55 MHz.

The expression "span a frequency range" refers to the length between outer endpoints of a union, that is, a union of frequency ranges spans the frequency range located between the outer endpoints of the union. For example, the union [1000, 1020]∪[1050, 1055] spans the frequency range [1000, 1055].

FIG. 1 is a schematic representation of exemplary first and second subband configurations 100, 150, corresponding to first and second search spaces, in accordance with an exemplary embodiment.

Although two subband configurations are shown in FIG. 1, one of ordinary skill in the art will appreciate that any number of subband configurations may be appropriate. For example, a third subband configuration (corresponding to a third search space) could be provided. The first and second subband configurations 100, 150 are both shown along system bandwidth 102. In an embodiment, the system bandwidth does not vary during normal operation. The first subband configuration 100 may correspond to a first time interval or period. The second subband configuration 150 may correspond to a second time interval or period. In an embodiment, the first and second time intervals may correspond to first and second transmission time intervals (TTIs). The first and second time intervals may correspond to first and second slots.

In FIG. 1, the first subband configuration 100 is shown including four subbands 106, 108, 110, 112 spanning a first bandwidth or frequency range 114. Subbands 106, 108, 110, 112 are shown abutting one another along center frequencies (or otherwise along a default frequency) of system bandwidth 102. The system bandwidth 102 is illustrated extending from a minimum frequency $f_{min}$ to a maximum frequency $f_{max}$. Alternatively, subbands may be placed along other frequencies, either abutting one another, or spread apart. Returning to the subbands 106, 108, 110, 112 shown in FIG. 1 along center frequencies, initial communication with UEs entering a coverage area may be simplified with the configuration shown. In an embodiment, a UE within a cell may, during the first time interval, search within bandwidth 114 (i.e., within subbands 106, 108, 110, 112) for candidate control channels to decode. The candidate control channels may be received from a network node (e.g., a BS), or from another device. Stated differently, during the first time interval, a UE search space may be within subbands 106, 108, 110, 112.

The UE may switch search spaces, that is, from the first subband configuration to the second subband configuration. The first and second subband configurations 100, 150 may correspond to predefined first and second search space configurations. The predefined first and second search space configurations may have been semi-statically configured or configured using higher-layer signaling. In other words, during the second time interval, the UE may search within subbands 156, 158, 160, 162 for candidate control channels to decode, that is, during the second time interval, the UE search space may be within subbands 156, 158, 160, 164.

The UE may, prior to the second time interval 154, receive an instruction to use the second search space configuration. In an embodiment, the instruction may be received using dynamic signaling. The instruction may be received in downlink control information (DCI). The instruction may be received in one or more decoded control channels or in Medium Access Control (MAC) control elements. This allows for frequent adaptation of the search space configuration in use.

In an embodiment, the second bandwidth configuration may include an equal number of subbands as the first bandwidth configuration. It may then be possible to reuse some aspects or properties of the resource mapping of the control channel(s) for the first bandwidth configuration when switching to the second bandwidth configuration, and vice versa. For example, the second bandwidth configuration 150 is shown in FIG. 1 as including four subbands 156, 158, 160, 162 just as the first bandwidth configuration 100 includes four subbands 106, 108, 110, 112. The subbands 106, 108, 110, 112 of the first bandwidth configuration 100 may be in a one-to-one relationship with the subbands 156, 158, 160, 162 of the second bandwidth configuration. One or more of pairs of related subbands (e.g., 106 and 156) may be of equal bandwidth. For example, as shown in FIG. 1, each pair of related subbands (i.e., 106 and 156, 108 and 158, 110 and 160, and 112 and 162) may be of equal bandwidth. The resource mapping of the control channel(s) may then be adapted from the first to the second bandwidth configuration by a simple frequency shift.

As shown in FIG. 1, the four subbands 156, 158, 160, 162 span a second bandwidth 164 or frequency range. One or both endpoints of the first frequency range 114 may be different from one or both endpoints of the second frequency range 164. For example, in FIG. 1, both endpoints of the first frequency range 114 are shown as being different from both endpoints of the second frequency range 164.

Subbands 156, 158, 160, 162 are shown as being separate from one another along system bandwidth 102. Subband locations of a second bandwidth configuration may be determined based on different concerns. For example, non-contiguous subbands 156, 158, 160, 162 may be selected so as to be non-contiguous along system bandwidth 102 so as to reduce interference between individual subbands 156, 158, 160, 162. As another example, subbands 156, 160, 162 are shown removed from the center frequencies of system bandwidth 102 so as to reduce interference with other traffic utilizing the center frequencies of the system bandwidth 102.

One or more designated subbands of the first subband configuration 100 may overlap or coincide in frequency with one or more designated subbands in the second subband configuration 150. For example, in the embodiment shown in FIG. 1, subband 108 may overlap or coincide in frequency with subband 158. In an embodiment, this area of the search space in a cell may be a common search space. Stated differently, a control channel carrying common control information may be decoded by one or more UEs in the designated subband (108, 158 in the example of FIG. 1). The common control information may include one or more of a random access response, a paging-related message, system information, and a message directed to a plurality of UEs. This may allow UEs to decode the common control information, or other information carried in the designated subband, without having to decode information relating to search space reconfiguration and/or to a subband configuration currently in use.

Figure 2:
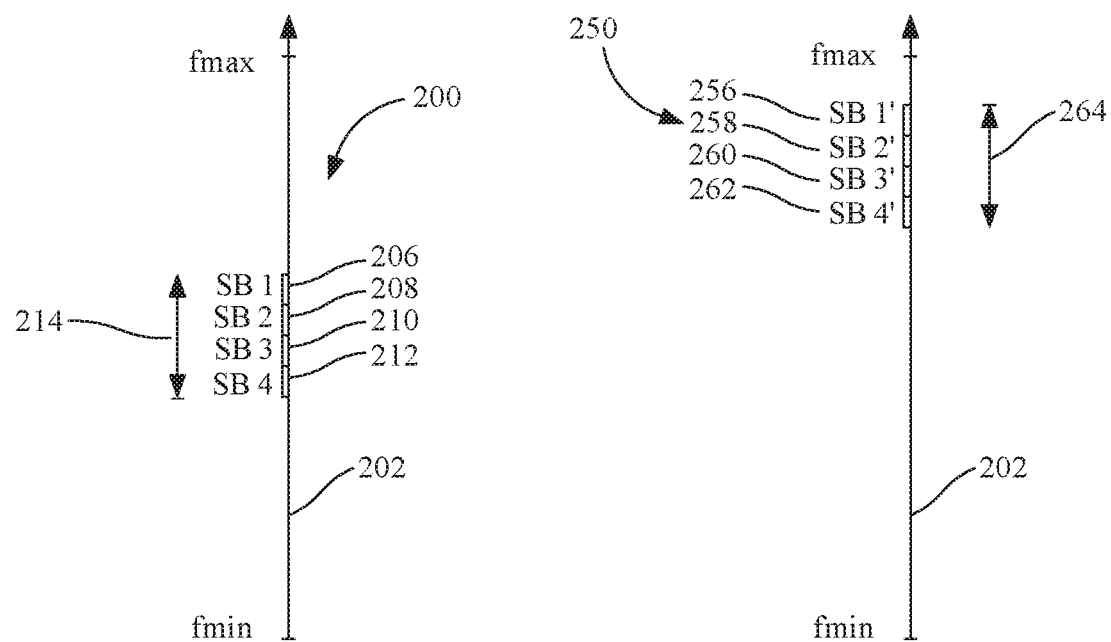
FIG. 2 is a schematic representation of exemplary first and second subband configurations corresponding to first and second search spaces, in accordance with an exemplary embodiment.

FIG. 2 is a schematic representation of exemplary first and second subband configurations 200, 250, corresponding to first and second search spaces, in accordance with an exemplary embodiment. In describing FIG. 2 and the remaining figures, a discussion of features similar to those already described is omitted in the interest of brevity. In FIG. 2, the second subband configuration 250 spans a second bandwidth 264 or frequency range. Subbands 256, 258, 260, 262 are shown abutting one another along system bandwidth 202, just as subbands 206, 208, 210, 212 are shown abutting one another. However, the subbands 256, 258, 260, 262 of the second subband configuration 250 span a different bandwidth (i.e., the second bandwidth 264 or frequency range) than the subbands 206, 208, 210, 212 of the first subband configuration 200. In the example shown in FIG. 2, the location of the subbands 256, 258, 260, 262 are determined in an attempt to reduce interference with traffic utilizing the center frequencies of the system bandwidth 202.

Figure 3:
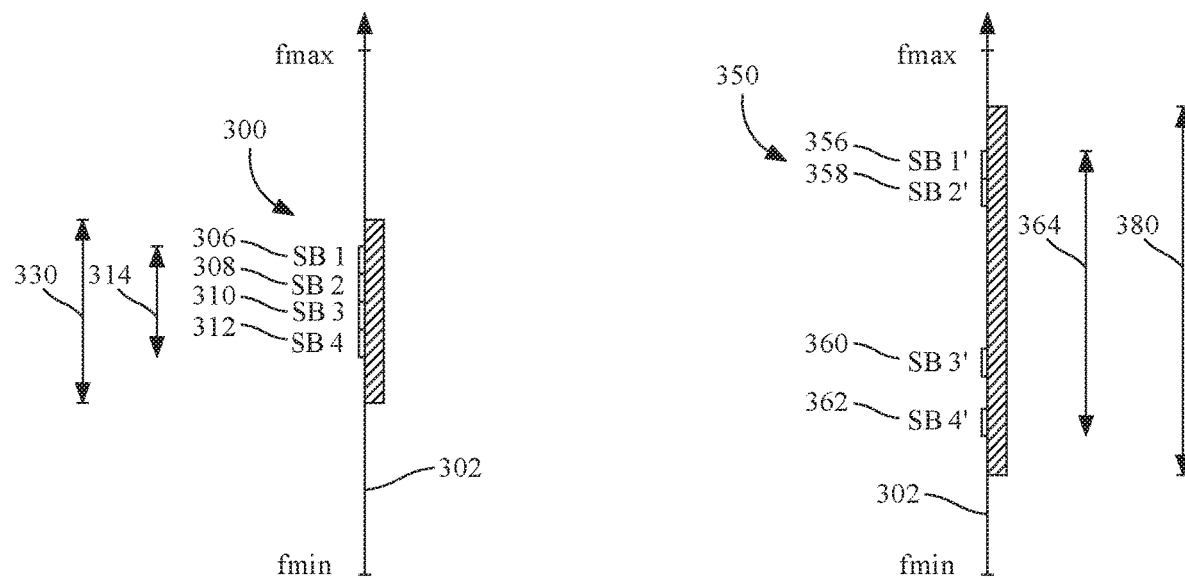
FIG. 3 is a schematic representation of exemplary first and second frequency ranges for receiving shared downlink channel data, in accordance with an exemplary embodiment.

FIG. 3 is a schematic representation of exemplary first and second frequency ranges for receiving downlink shared channel or downlink data channel data 330, 380, in accordance with an exemplary embodiment. The first and second frequency ranges 330, 380 are both shown along system bandwidth 302 and relative to first and second subband configurations 300, 350. The first frequency range for receiving shared downlink channel data 330 may correspond to a first time interval or period. The second frequency range for receiving shared downlink channel data 380 may correspond to a second time interval or period.

In addition to the above-discussed express instruction that a UE may receive to use a second bandwidth configuration, additional actions may implicitly trigger, for example, an expansion in a subband configuration. For example, in an embodiment, the second bandwidth 364 may be greater than the first bandwidth 314, as shown in FIG. 3. Prior to the second time interval 354, a downlink assignment may be received by the UE. For example, a downlink assignment corresponding to an increase in total bandwidth may be received. A downlink assignment corresponding to an increase in spanned bandwidth may be received. Alternatively, a downlink assignment reaching or exceeding a preconfigured threshold on total bandwidth or spanned bandwidth may be received. As another example of an action that may implicitly trigger expansion, data may be received in a first frequency range 330 containing the first subband configuration 300 but not the second subband configuration 350. The data may be received on resources at least partially belonging to the first subband configuration 300. In the second interval 354, data may be received in the second frequency range 380 including the second subband configuration 350. The data may be received on resources at least partially belonging to the second subband configuration 350.

Thus far, some embodiments have focused on expanding from a first subband configuration to a second subband configuration or moving from an original subband configuration to a second subband configuration. In some embodiments, it may be desirable to collapse from a first subband configuration to a second subband configuration or to move to an original subband configuration. This collapsing is discussed with reference to FIG. 4, which is a schematic representation of DL assignments 402 and subband configurations 404 in use relative to time 406, in accordance with an exemplary embodiment.

At a first time, a UE may receive a DL assignment 330 corresponding to a collapsed subband configuration 300 similar to subband configuration 300 shown in FIG. 3. The UE may, at the first time, be in the collapsed subband configuration 300.

At a second time 410, the UE may receive a DL assignment 380 corresponding to an expanded subband configuration 350 similar to subband configuration 350 shown in FIG. 3. As a result of receiving the DL assignment 380 corresponding to an expanded subband configuration 350, the UE may, at the second time 410, change to the expanded subband configuration 350 and a timer 406 may be started. In an embodiment, the timer may be a countdown timer. Until the expiration of the timer 406, the UE may remain in the expanded subband configuration 350.

At a third time 412, the timer 406 may expire. As a result of the expiration of the timer 406, the UE may change (in this case, return) to the narrow subband configuration 300. Focusing on the expiration of the timer, the expanded subband configuration 350 may be the first subband configuration and the collapsed subband configuration 300 may be the second subband configuration. In this instance, a second bandwidth corresponding to the second subband configuration may be less than a first bandwidth corresponding to the first subband configuration. Upon determining the expiration of the timer running from a most recent downlink assignment reaching or exceeding a preconfigured threshold on total bandwidth or spanned bandwidth, the UE may switch from the first or expanded subband configuration 350 to the collapsed 300 or second subband configuration. The preconfigured threshold may be associated with the second subband configuration. For example, the preconfigured threshold may correspond to a maximum receiver bandwidth of the UE.

In another instance wherein the second bandwidth is less than the first bandwidth, upon determining the expiration of a timer running from a most recent downlink assignment, a UE may switch from the first or expanded subband configuration to the collapsed or second subband configuration. In yet another instance wherein the second bandwidth is less than the first bandwidth, upon receiving a downlink assignment, a UE may switch from the first or the expanded subband configuration to the collapsed or second subband configuration. In particular, the UE may switch immediately (e.g., in a time interval to which the downlink assignment pertains), without awaiting expiry of a timer. The downlink assignment may correspond to a decrease in scheduled bandwidth, or the downlink assignment may be below a preconfigured threshold.

Figure 4:
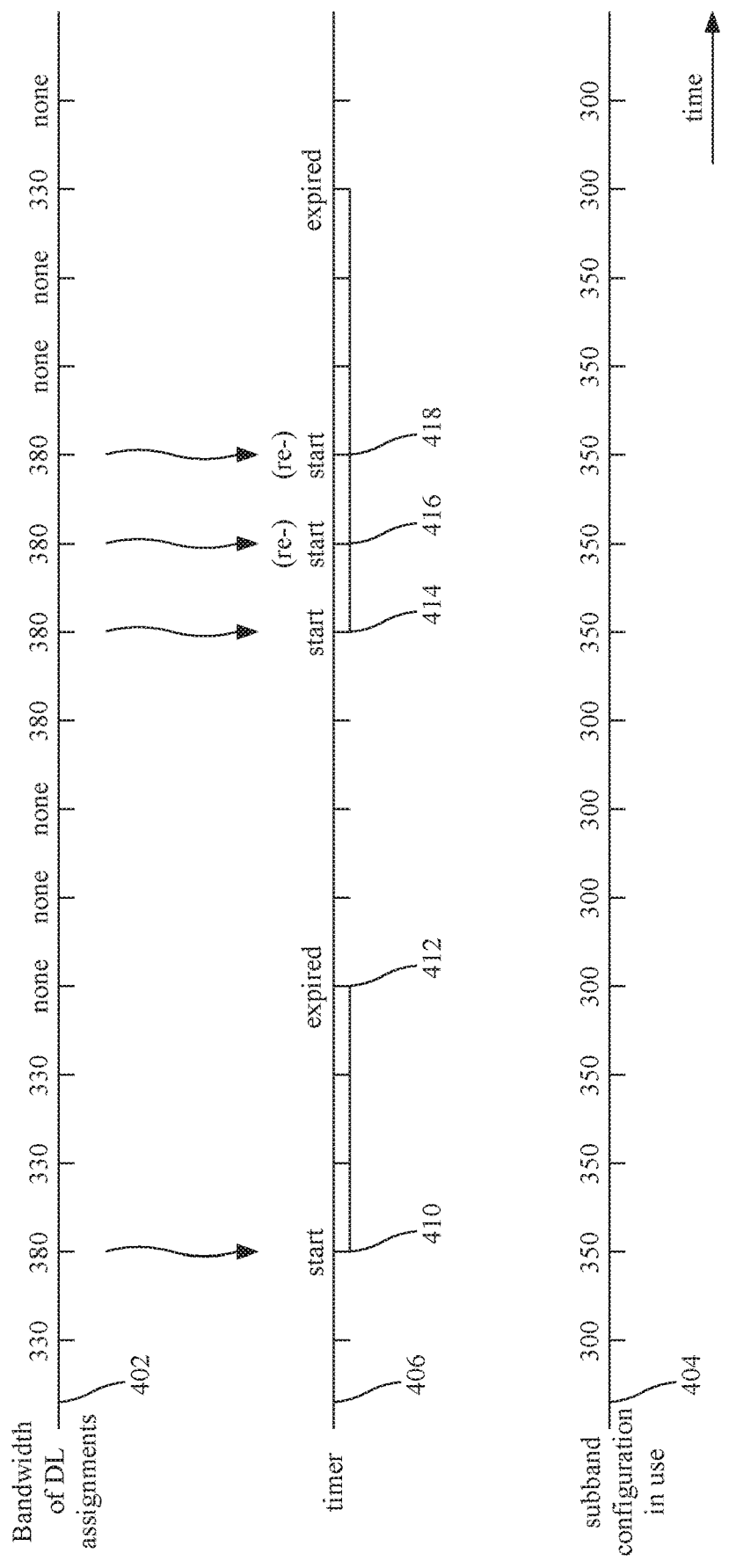
FIG. 4 is a schematic representation of downlink (DL) assignments and subband configurations in use relative to time, in accordance with an exemplary embodiment.

It should be noted that as shown in FIG. 4, the UE may, in some embodiments, remain in the expanded subband configuration at instances in time after the start of the timer 406 but before the third time 412 despite receiving DL assignments corresponding to the collapsed subband configuration.

Figure 5:
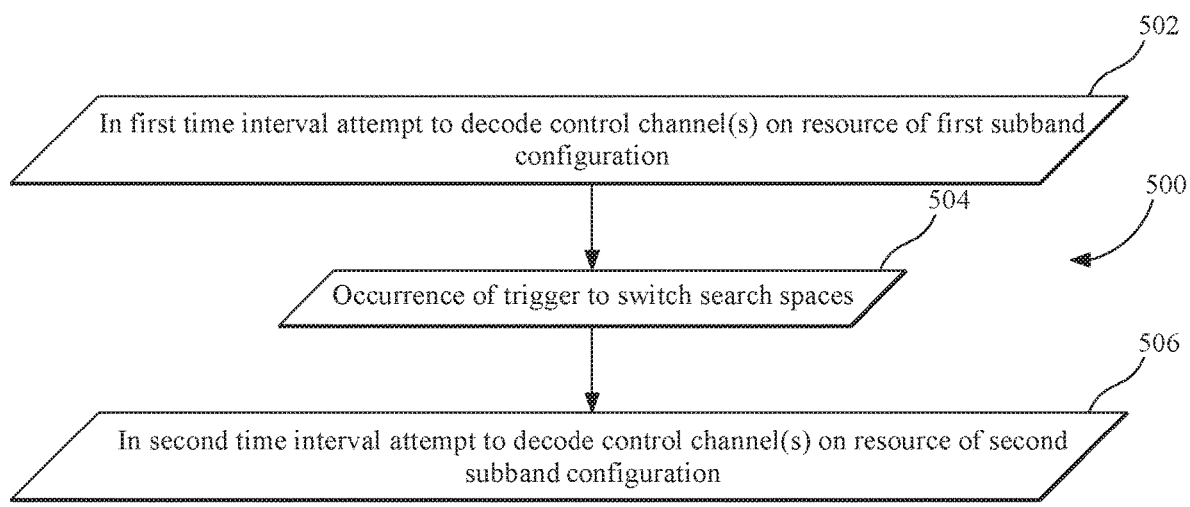
FIG. 5 is a flowchart of a method for decoding control channels, in accordance with an exemplary embodiment.

FIG. 5 is a flowchart of a method 500 for decoding control channels, in accordance with an exemplary embodiment. In operation 502, a UE, in a first time interval, may attempt to decode one or more control channels on downlink or sidelink resources of a first subband configuration. In operation 504, the occurrence of a trigger may cause the UE to switch search spaces. In operation 506, the UE, in a second time interval, may attempt to decode one or more control channels on downlink or sidelink resources of a second subband configuration.

Figure 6:
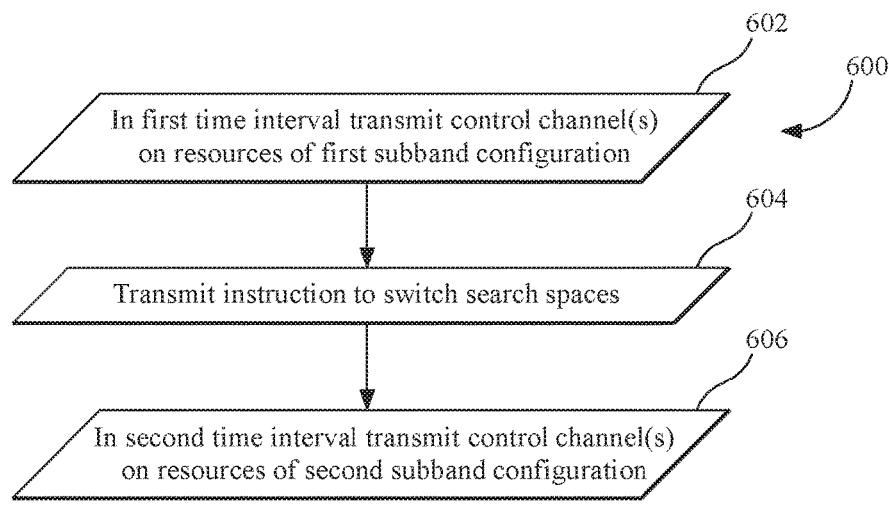
FIG. 6 is a flowchart of a method for transmitting control channels, in accordance with an exemplary embodiment.

FIG. 6 is a flowchart of a method 600 for transmitting control channels, in accordance with an exemplary embodiment. In operation 602, a network node, in a first time interval, may transmit a control channel on downlink or sidelink resources of a first subband configuration to a UE. In operation 604, the network node may, for example, transmit an instruction to switch search spaces to the UE. In operation 606, the network node, in a second time interval, may transmit a control channel on downlink or sidelink resources of a second subband configuration to a UE.

Thus far embodiments have generally focused on methods associated with enabling variable subband configuration of one or more search spaces by a UE, however other embodiments relate to devices, e.g., UEs, and network nodes, e.g., base stations or eNBs, within which such methods can be implanted. Thus, according to some embodiments, the various functions described above can be performed by apparatus which include a module for performing each function.

Figure 7:
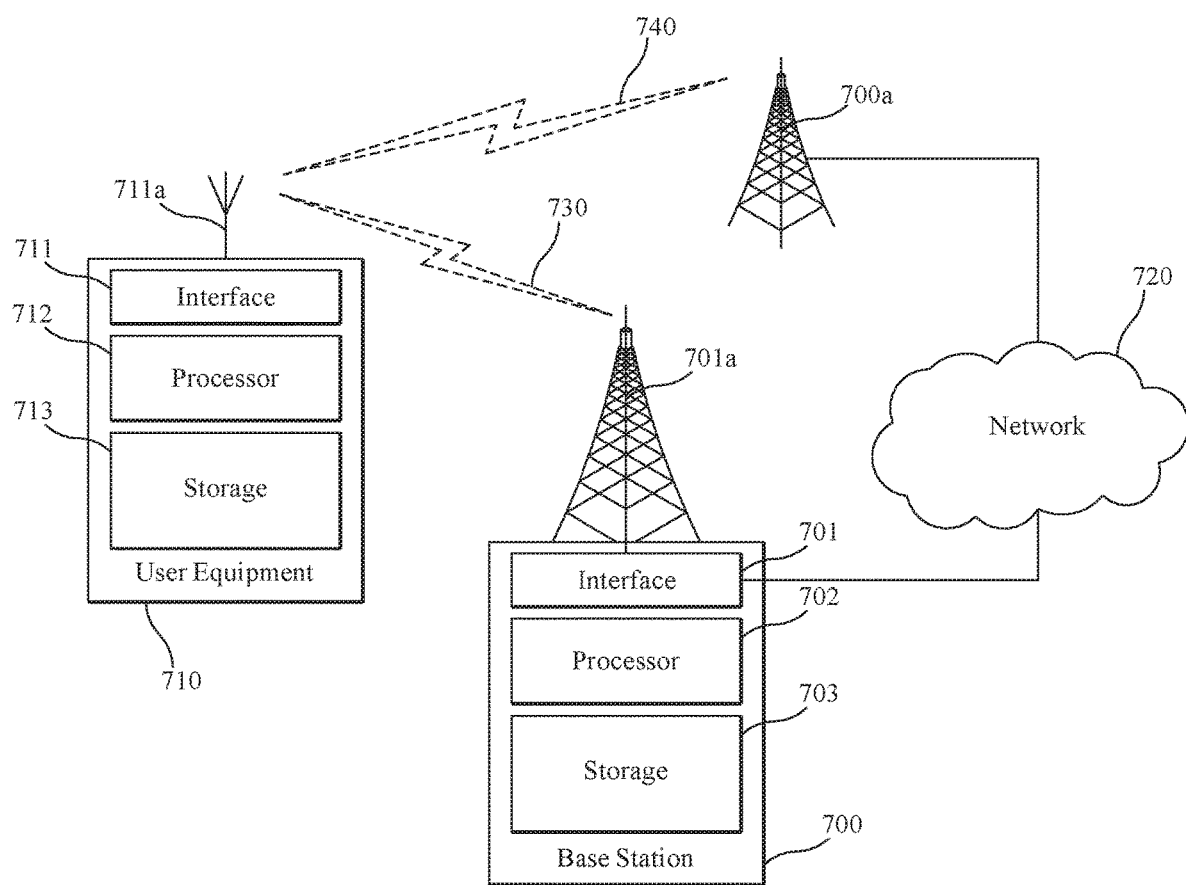
FIG. 7 is a schematic representation of a wireless network comprising a more detailed view of network node and a user equipment (UE), in accordance with an exemplary embodiment.

As another example of structural embodiments, FIG. 7 is a schematic representation of a wireless network comprising a more detailed view of network node 700 and a user equipment (UE) 710, in accordance with an exemplary embodiment. For simplicity, FIG. 7 only depicts network 720, network nodes 700 and 700a, and UE 710. Network node 700 may comprise processor 702, storage 703, interface 701, and antenna 701a. Similarly, UE 710 may comprise processor 712, storage 713, interface 711 and antenna 711a. These components may work together in order to provide network node and/or UE functionality, such as providing wireless connections in a wireless network. In different embodiments, the wireless network may comprise any number of wired or wireless networks, network nodes, base stations, controllers, UEs, wireless devices, relay stations, and/or any other components that may facilitate or participate in the communication of data and/or signals whether via wired or wireless connections.

Network 720 may comprise one or more IP networks, public switched telephone networks (PSTNs), packet data networks, optical networks, wide area networks (WANs), local area networks (LANs), wireless local area networks (WLANs), wired networks, wireless networks, metropolitan area networks, and other networks to enable communication between devices.

Network node 700 components 701, 702, 703 are depicted as single boxes located within a single larger box. In practice however, a network node may comprises multiple different physical components that make up a single illustrated component (e.g., interface 701 may comprise terminals for coupling wires for a wired connection and a radio transceiver for a wireless connection). As another example, network node 700 may be a virtual network node in which multiple different physically separate components interact to provide the functionality of network node 700 (e.g., processor 702 may comprise three separate processors located in three separate enclosures, where each processor is responsible for a different function for a particular instance of network node 700). Similarly, network node 700 may be composed of multiple physically separate components (e.g., a NodeB component and a RNC component, a BTS component and a BSC component, etc.), which may each have their own respective processor, storage, and interface components. In certain scenarios in which network node 700 comprises multiple separate components (e.g., BTS and BSC components), one or more of the separate components may be shared among several network nodes. For example, a single RNC may control multiple NodeB's. In such a scenario, each unique NodeB and BSC pair, may be a separate network node. In some embodiments, network node 700 may be configured to support multiple radio access technologies (RATs). In such embodiments, some components may be duplicated (e.g., separate storage 703 for the different RATs) and some components may be reused (e.g., the same antenna 701a may be shared by the RATs).

Processor 702 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in conjunction with other network node 700 components, such as storage 703, network node 700 functionality. For example, processor 702 may execute instructions stored in storage 703. Such functionality may include providing various wireless features discussed herein to a wireless devices, such as UE 710, including any of the features or benefits disclosed herein.

Storage 703 may comprise any form of volatile or non-volatile computer readable memory including, without limitation, persistent storage, solid state memory, remotely mounted memory, magnetic media, optical media, random access memory (RAM), read-only memory (ROM), removable media, or any other suitable local or remote memory component. Storage 703 may store any suitable instructions, data or information, including software and encoded logic, utilized by network node 700. Storage 703 may be used to store any calculations made by processor 702 and/or any data received via interface 701.

Network node 700 also comprises interface 701 which may be used in the wired or wireless communication of signaling and/or data between network node 700, network 720, and/or UE 710. For example, interface 701 may perform any formatting, coding, or translating that may be needed to allow network node 700 to send and receive data from network 720 over a wired connection. Interface 701 may also include a radio transmitter and/or receiver that may be coupled to or a part of antenna 701a. The radio may receive digital data that is to be sent out to other network nodes or UEs via a wireless connection. The radio may convert the digital data into a radio signal having the appropriate channel and bandwidth parameters. The radio signal may then be transmitted via antenna 701a to the appropriate recipient (e.g., UE 710).

Antenna 701a may be any type of antenna capable of transmitting and receiving data and/or signals wirelessly. In some embodiments, antenna 701a may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line.

UE 710 may be any type of wireless endpoint, mobile station, mobile phone, wireless local loop phone, smartphone, user equipment, desktop computer, PDA, cell phone, tablet, laptop, VoIP phone or handset, which is able to wirelessly send and receive data and/or signals to and from a network node, such as network node 700 and/or other UEs via uplink signals and downlink signals, or sidelink signals, respectively. UE 710 may comprise processor 712, storage 713, interface 711, and antenna 711a. Like network node 700, the components of UE 710 are depicted as single boxes located within a single larger box, however in practice a wireless device may comprises multiple different physical components that make up a single illustrated component (e.g., storage 713 may comprise multiple discrete microchips, each microchip representing a portion of the total storage capacity).

Processor 712 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in combination with other UE 710 components, such as storage 713, UE 710 functionality. Such functionality may include providing various wireless features discussed herein, including any of the features or benefits disclosed herein. In particular, the processor 712 may comprise two or more sub-processors.

Storage 713 may be any form of volatile or non-volatile memory including, without limitation, persistent storage, solid state memory, remotely mounted memory, magnetic media, optical media, random access memory (RAM), read-only memory (ROM), removable media, or any other suitable local or remote memory component. Storage 713 may store any suitable data, instructions, or information, including software and encoded logic, utilized by UE 710. Storage 713 may be used to store any calculations made by processor 712 and/or any data received via interface 711.

Interface 711 may be used in the wireless communication of signaling and/or data between UE 710 and network node 700. For example, interface 711 may perform any formatting, coding, or translating that may be needed to allow UE 710 to send and receive data from network node 700 over a wireless connection. Interface 711 may also include a radio transmitter and/or receiver that may be coupled to or a part of antenna 711a. The radio may receive digital data that is to be sent out to network node 701 via a wireless connection. The radio may convert the digital data into a radio signal having the appropriate channel and bandwidth parameters. The radio signal may then be transmitted via antenna 711a to network node 700.

Antenna 711a may be any type of antenna capable of transmitting and receiving data and/or signals wirelessly. In some embodiments, antenna 711a may comprise one or more omni-directional, sector or panel antennas operable to transmit/receive radio signals between 2 GHz and 66 GHz. For simplicity, antenna 711a may be considered a part of interface 711 to the extent that a wireless signal is being used.

Thus, the embodiments disclosed in this section provide radio communication systems, devices and methods for enabling variable subband configuration of one or more search spaces. It should be understood that this description is not intended to limit the invention. On the contrary, the exemplary embodiments are intended to cover alternatives, modifications and equivalents, which are included in the spirit and scope of the invention. Further, in the detailed description of the exemplary embodiments, numerous specific details are set forth in order to provide a comprehensive understanding of the invention. However, one skilled in the art would understand that various embodiments may be practiced without such specific details.

Figure 8:
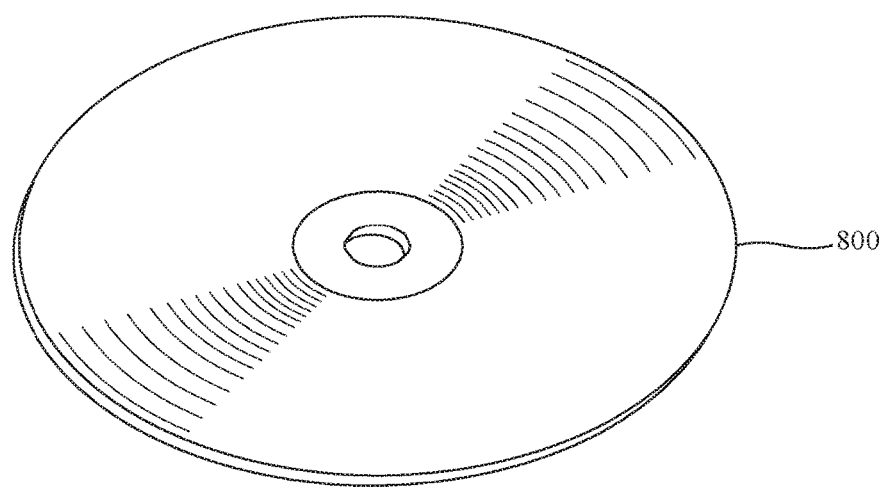
FIG. 8 is a schematic representation of a computer-readable storage medium, in accordance with an exemplary embodiment.

Although the features and elements of the present exemplary embodiments are described in the embodiments in particular combinations, each feature or element can be used alone without the other features and elements of the embodiments or in various combinations with or without other features and elements disclosed herein. The methods or flowcharts provided in the present application may be implemented in a computer program, software or firmware tangibly embodied in a computer-readable storage medium, such as the computer-readable storage medium 800 of FIG. 8, for execution by a computer or a processor.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

The invention claimed is:

1. A method implemented in a user equipment, UE, comprising:
   in a first time interval, attempting to decode one or more control channels on downlink resources of a first subband configuration, wherein the first subband configuration corresponds to a first search space configuration indicated to the UE using higher layer signaling and comprising a first set of candidate control channels, and wherein the first subband configuration spans a first frequency range;
   in a second time interval, attempting to decode one or more control channels on downlink resources of a second subband configuration, wherein the second subband configuration corresponds to a second search space configuration indicated to the UE using higher layer signaling and comprising a second set of candidate control channels, and wherein the second subband configuration spans a second frequency range different from the first frequency range;
   prior to the second time interval, receiving a bandwidth change instruction triggering use of the second subband configuration and the second search space configuration comprising the second set of candidate control channels; and
   in response to receiving the bandwidth change instruction, attempting to decode the one or more control channels on the downlink resources of the second subband configuration, starting a timer, and in response to expiration of the timer switching from the second subband configuration to a third subband configuration different from the first and second subband configurations.

2. The method of claim 1, wherein the first frequency range has a first bandwidth and the second frequency range has a second bandwidth different from the first bandwidth.

3. The method of claim 2, wherein the second bandwidth is greater than the first bandwidth, the method further comprising:
   in the first time interval, receiving data in a first frequency range containing the first subband configuration but not the second subband configuration; and
   in the second time interval, receiving data in a second frequency range containing the second subband configuration.

4. The method of claim 2, wherein the second bandwidth is greater than the first bandwidth, the method further comprising receiving, prior to the second time interval, one of:
   a downlink assignment corresponding to an increase in total bandwidth,
   a downlink assignment corresponding to an increase in spanned bandwidth,
   a downlink assignment reaching or exceeding a preconfigured threshold on total bandwidth or spanned bandwidth.

5. The method of claim 2, wherein the second bandwidth is less than the first bandwidth, the method further comprising:
   determining expiry of a timer running from a most recent downlink assignment reaching or exceeding a preconfigured threshold on total bandwidth or spanned bandwidth.

6. The method of claim 5, wherein the preconfigured threshold is associated with the second subband configuration.

7. The method of claim 6, wherein the preconfigured threshold corresponds to a maximum receiver bandwidth of the UE.

8. The method of claim 2, wherein the second bandwidth is less than the first bandwidth, the method further comprising:
   determining expiry of a timer running from a most recent downlink assignment.

9. The method of claim 2, wherein the second bandwidth is less than the first bandwidth, the method further comprising receiving, prior to the second time interval, one of:
   a downlink assignment corresponding to a decrease in scheduled bandwidth,
   a downlink assignment below a preconfigured threshold.

10. The method of claim 1, wherein one endpoint of the first frequency range is different from one or both endpoints of the second frequency range.

11. The method of claim 1, wherein the subbands in the first subband configuration occupy a total bandwidth equal to that of the subbands of the second subband configuration.

12. The method of claim 1, wherein the first and second subband configurations consist of an equal number of subbands.

13. The method of claim 12, wherein the subbands of the first subband configuration are in a one-to-one relationship with the subbands of the second subband configuration.

14. The method of claim 13, wherein each pair of related subbands are of equal bandwidth.

15. The method of claim 1, wherein the first subband configuration comprises at least one designated subband, which overlaps or coincides in frequency with a designated subband of the second subband configuration.

16. The method of claim 15, further comprising decoding on the designated subband a control channel carrying common control information.

17. The method of claim 16, wherein the common control information includes one or more of:
   a random access response,
   a paging-related message,
   system information, and
   a message directed to a plurality of UEs.

18. The method of claim 1, wherein the bandwidth change instruction is received by dynamic signaling.

19. The method of claim 18, wherein the bandwidth change instruction is received in downlink control information, DCI.

20. The method of claim 1, wherein the bandwidth change instruction is received in higher-layer signaling.

21. The method of claim 1, wherein at least a third search space configuration is predefined in addition to the first and second search space configurations.

22. The method of claim 1, wherein the first and second time intervals correspond to first and second transmission time intervals, TTIs.

23. The method of claim 1, wherein the first and second time intervals correspond to first and second slots.

24. The method of claim 1, wherein the first set of candidate control channels are formed by control channel elements (CCEs) at a first given CCE aggregation level, and wherein the second set of candidate control channels are formed by CCEs at a second given CCE aggregation level.

25. A user equipment UE comprising a communication interface and processing circuitry configured to cause the UE:
- in a first time interval, to attempt to decode one or more control channels received using the communication interface on downlink resources of a first subband configuration, wherein the first subband configuration corresponds to a first search space configuration indicated to the UE using higher layer signaling and comprising a first set of candidate control channels, and wherein the first subband configuration spans a first frequency range;
- in a second time interval, attempt to decode one or more control channels received using the communication interface on downlink resources of a second subband configuration wherein the second subband configuration corresponds to a second search space configuration indicated to the UE using higher layer signaling and comprising a second set of candidate control channels, and wherein the second subband configuration spans a second frequency range different from the first frequency range,
- prior to the second time interval, receive a bandwidth change instruction triggering use of the second subband configuration and the second search space configuration comprising the second set of candidate control channels, and
- in response to receiving the bandwidth change instruction attempt to decode the one or more control channels received using the communication interface on the downlink resources of the second subband configuration, start a timer, and in response to expiration of the timer switch from the second subband configuration to a third subband configuration different from the first and second subband configurations.

26. The UE of claim 25, wherein the first set of candidate control channels are formed by control channel elements (CCEs) at a first given CCE aggregation level, and wherein the second set of candidate control channels are formed by CCEs at a second given CCE aggregation level.

27. The UE of claim 25, wherein the first frequency range has a first bandwidth and the second frequency range has a second bandwidth different from the first bandwidth.

28. The UE of claim 27, wherein the second bandwidth is greater than the first bandwidth, and the UE receives, prior to the second time interval, one of:
- a downlink assignment corresponding to an increase in total bandwidth,
- a downlink assignment corresponding to an increase in spanned bandwidth,
- a downlink assignment reaching or exceeding a preconfigured threshold on total bandwidth or spanned bandwidth.

29. The UE of claim 27, wherein the second bandwidth is less than the first bandwidth, and the UE determines expiry of a timer running from a most recent downlink assignment reaching or exceeding a preconfigured threshold on total bandwidth or spanned bandwidth.

30. The UE of claim 29, wherein the preconfigured threshold is associated with the second subband configuration.

31. The UE of claim 30, wherein the preconfigured threshold corresponds to a maximum receiver bandwidth of the UE.

32. The UE of claim 31, wherein the second bandwidth is less than the first bandwidth, and the UE determines expiry of a timer running from a most recent downlink assignment.

33. The UE of claim 27, wherein the second bandwidth is less than the first bandwidth, and the UE receives, prior to the second time interval, one of:
- a downlink assignment corresponding to a decrease in scheduled bandwidth,
- a downlink assignment below a preconfigured threshold.

34. The UE of claim 25, wherein one endpoint of the first frequency range is different from one or both endpoints of the second frequency range.

35. The UE of claim 25, wherein the subbands in the first subband configuration occupy a total bandwidth equal to that of the subbands of the second subband configuration.

36. The UE of claim 25, wherein the first and second subband configurations consist of an equal number of subbands.

37. The UE of claim 25, wherein the first subband configuration comprises at least one designated subband, which overlaps or coincides in frequency with a designated subband of the second subband configuration.

38. The UE of claim 25, wherein the bandwidth change instruction is received by dynamic signaling.

39. The UE of claim 25, wherein the bandwidth change instruction is received in higher-layer signaling.

40. The UE of claim 25, wherein the first and second time intervals correspond to first and second transmission time intervals, TTIs.

41. The UE of claim 25, wherein the first and second time intervals correspond to first and second slots.

* * * * *

UNITED STATES PATENT AND TRADEMARK OFFICE
CERTIFICATE OF CORRECTION

PATENT NO. : 10,631,280 B2
APPLICATION NO. : 15/519930
DATED : April 21, 2020
INVENTOR(S) : Baldemair et al.

It is certified that error appears in the above-identified patent and that said Letters Patent is hereby corrected as shown below:

In the Specification

In Column 1, Line 27, delete "non-infective" and insert -- non-injective --, therefor.

Signed and Sealed this
Eighteenth Day of August, 2020

Andrei Iancu
*Director of the United States Patent and Trademark Office*